United States Patent [19]

Liles et al.

[11] 3,882,391
[45] May 6, 1975

[54] TESTING THE STABILITY OF MOSFET DEVICES

[75] Inventors: Robert E. Liles, Pleasant Valley; Gerald D. O'Rourke, Poughkeepsie, both of N.Y.

[73] Assignee: International Business Machines Corporation, Armonk, N.Y.

[22] Filed: June 25, 1973

[21] Appl. No.: 373,042

[52] U.S. Cl. .................. 324/158 D; 324/158 R
[51] Int. Cl. ............................. G01r 31/26
[58] Field of Search ........ 324/158 D, 158 T, 158 R; 29/574

[56] References Cited
OTHER PUBLICATIONS

Kerr et al., "Stabilization of SiO₂ . . . "; IBM, J. Res. Develop.; Sept. 1964, pp. 376–384.

Kerr; D. R., "Effect of Temperature..."; IBM, J. Res. Develop., Sept., 1964, pp. 385–393.

Primary Examiner—Alfred E. Smith
Assistant Examiner—Ernest F. Karlsen
Attorney, Agent, or Firm—Thomas F. Galvin

[57] ABSTRACT

A method for testing the threshold stability of a MOSFET device including a phosphosilicate glass (PSG) thin film which covers the gate insulator to trap contaminants. The test comprises an electric field stress at ambient temperature for a short interval to determine polarization of the PSG film. The flat band potentials ($V_{FB}$) measured before and after the stress period are used to determine whether the amount of PSG is sufficient to trap the contaminants present.

6 Claims, 7 Drawing Figures

3,882,391

TESTING THE STABILITY OF MOSFET DEVICES

CROSS REFERENCE TO A RELATED APPLICATION

Application Ser. No. 357,046, filed May 3, 1973, in the name of R. H. Collins et al and assigned to the same assignee as the present invention.

BACKGROUND OF THE INVENTION

1. Field of the Invention

This invention relates to techniques for testing MOSFET and similar semiconductor devices. In particular, it relates to techniques for testing the long term stability of such devices.

2. Description of the Prior Art

The use of PSG films to cover thermally grown $SiO_2$ layers on IGFET devices is by now well known in the semiconductor field. As described in an article by Kaplan and Lowe entitled "Phosphosilicate Glass Stabilization of MOS Structures," *J. Electrochem. Soc.*, Vol. 118, No. 10, October, 1971, PSG films prevent the drift of cationic impurities such as sodium into the active areas of a device. These impurities are responsible for instability in threshold voltage ($V_t$). It appears that the PSG layer acts as getter for Na+ ions, removing them from the SiO2 layer and also acting as a trap for ions introduced subsequently.

Improved semiconductor processing techniques have reduced the amount of impurities which can affect the devices; however, as the performance levels of semiconductor microcircuits increase and the circuit density becomes greater, the amount of impurities which can cause catastrophic failures in the circuits is smaller. Thus, at the present state of the art the use of some type of stabilization system, such as PSG, is required on practically all microcircuit technology.

There are certain inherent limitations in the use of PSG as a protective film. Films of useful thickness and phosphorous concentration exhibit two important effects, a negative shift in $V_{FB}$ at time zero without stress and a polarization shift when placed under electric stress. Thus, while PSG prevents migration of ion to the silicon dioxide, the addition of the PSG layer causes an increase in $V_{FB}$ which corresponds to a decreased threshold voltage, $V_t$, for N channel devices and to an increased (negative) $V_t$ for P channel devices. Variations of $V_t$ after the device has been placed under stress in operating systems are of course quite undesirable. The total variation is composed of the PSG polarization and ion drift shift. If the variation exceeds a certain design point, the circuits under operating conditions will become either unreliable or completely inoperative. Therefore, researchers in this field have attempted to devise test techniques for predicting the ultimate operation of the device under practical environment conditions.

In some techniques, such as ellipsometry or electron microprobe techniques, the thickness of the PSG film itself is measured to determine the amount of PSG atop the oxide insulator. However, these tests must be done off-line and are generally destructive of the device. In addition, merely measuring the amount of PSG available does not indicate whether that amount is sufficient to trap the contaminants present.

In attempting to correlate the results of a relatively short test period with events which might occur during the lifetime of a device, commonly ten years or more, the art has developed the technique of subjecting the MOSFET devices to relatively severe stress immediately after manufacture for a certain time interval. The results of this test are used to predict the ultimate operation of the device. These tests have been more or less successful but have the shortcoming that they may deleteriously affect the operation of the devices due to the severity of the test. More significantly, they are quite complicated and difficult to practice on the production line.

For example, in testing MOSFET devices using PSG glass over a thin gate oxide, the preferred method until the advent of the present invention has been to measure the small signal capacitance of a test device in order to obtain the initial silicon flat band potential ($V_{FB}$). The devices are then subjected to a bias at a temperature of around 200°C, after which the device is cooled to room temperature under bias and $V_{FB}$ remeasured. This stressing at an elevated temperature causes the sodium ions to drift through the composite PSG-oxide film; and the change in threshold potential ($\Delta V_{FB}$) is a measure of the amount of contamination present.

This test has been reasonably reliable; however, it is quite time consuming and difficult to control. The test chamber must be heated for around 4 minutes to the temperature of 200°C, the stress potential must be applied for around 10 minutes and then the temperature must be turned down for 5 to 7 minutes to measure the difference in $V_{FB}$ before and after stress. There is also the practical problem associated with high temperature electrical testing of making accurate measurements of the wafer to insure that it is truly at 200°C. Additionally, the platinum probes which are used to connect the test device with the test equipment have a tendency to move at high temperatures, resulting in loss of contact which is quite difficult to detect on microminiature devices.

Perhaps the greatest disadvantage in using the above testing technique is that it is a measure of ion drift through the PSG oxide film rather than a direct measure of the amount of PSG available to control contamination. At elevated temperatures and bias stressing there are two principal components which contribute to change $V_{FB}$: PSG polarization and contamination ion drift. The ion drift term dominates at higher temperature and this test monitors charge that is quickly activated out of the PSG trap by means of electric field and thermal energy. Thus it is at best an indirect measure of the amount of PSG available to trap contaminants.

SUMMARY OF THE INVENTION

It is therefore a primary object of this invention to increase the accuracy of testing MOSFET devices having a contaminant trapping film of phosphosilicate glass (PSG) associated with the gate insulator.

It is a further object of this invention to reduce the time and the degree of difficulty of measuring the reliability of such devices.

It is yet another object of this invention to furnish a test system which can be used on the manufacturing line by making measurements of convenient device parameters.

These and other objects of the present invention are achieved by applying an electric field across a test device at ambient temperature for a short interval. The flat band potentials $V_{FB}$ measured before and after the stress period ($\Delta V_{FB}$) are compared to determine long term device reliability. The electric field must be applied for a duration sufficient to polarize the PSG film; and the temperature must be insufficient to cause the contaminants to drift.

This technique effects a separation of the aforementioned two variables of polarization and ion drift shifts which affect device instability.

We have found that the room temperature polarization shift of $V_{FB}$, $\Delta V_p$, is proportional to the mole percent thickness product of the PSG as expressed by the following:

$$\Delta V_p \propto (\text{Mole}\%) \cdot \frac{t_{PSG}}{t_{ox}} \quad (1)$$

where $t_{PSG}$ is the thickness of the PSG film and $t_{ox}$ is the combined thickness of the PSG film and the SiO2 layer.

After having determined the amount of PSG available, the amount of contaminants present can also be calculated. The results are compared to insure that there is sufficient PSG available to trap the contaminants present.

DESCRIPTION OF THE PREFERRED EMBODIMENT

Figure 1:
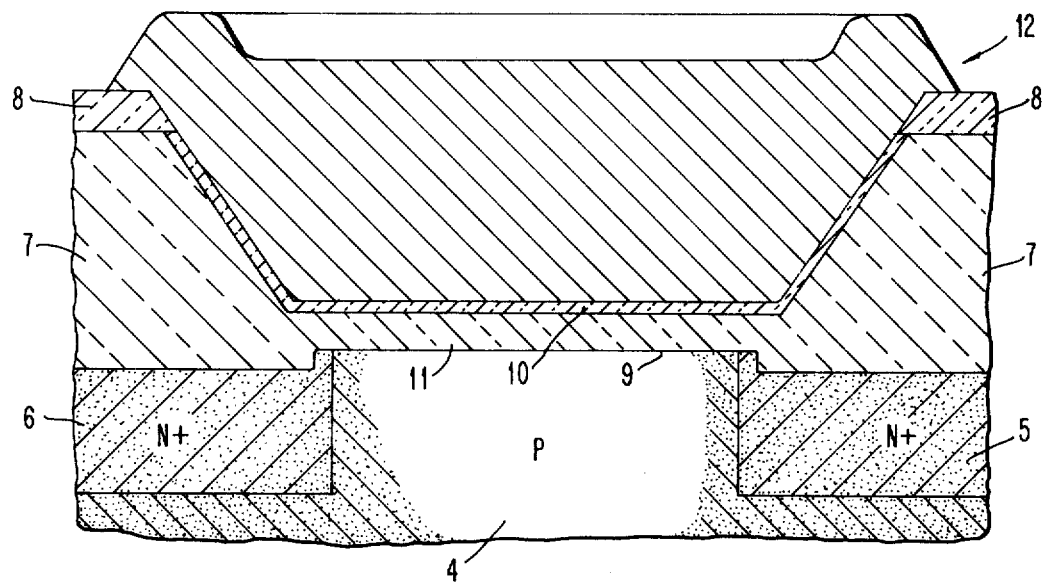
FIG. 1 is a cross-sectional schematic of a MOSFET device to be tested.

FIG. 1 illustrates a cross-sectional schematic diagram of a field effect transistor which is tested according to our invention. This transistor has been described in a prior patent application, Ser. No. 357,046, filed May 3, 1973 in the name of R. H. Collins et al and assigned to the same assignee as the present invention. That application is hereby incorporated by reference into the present application. Therefore, an extended discourse on the fabrication and structure of the device in FIG. 1 is unnecessary. Briefly, the device is a N-channel field effect transistor having source and drain regions 5 and 6 formed in a P type substrate 4. Overlying channel region 9 which lies between the source and drain region is a thin oxide layer 11 and a thin layer of phosphosilicate glass 10. Overlying a major portion of the source and drain regions are a thick oxide layer 7 and a relatively thick phosphosilicate glass layer 8. Metallization 12 which completely covers the gate region and extends over the thick PSG glass completes this structure. Thin oxide layer 11 is around 600A thick. PSG film 10 is around 100A thick and acts to trap ionic contaminants which might otherwise diffuse into the active regions of the device, causing it to fail. As pointed out in the above-identified application, the problem is especially serious on N-channel devices and is also a factor to be considered in P-channel devices. As previously discussed, it is quite important to establish that there is a sufficient amount of PSG to trap the contaminants which are in the structure and it is to this end that the present invention is directed.

Figure 2:
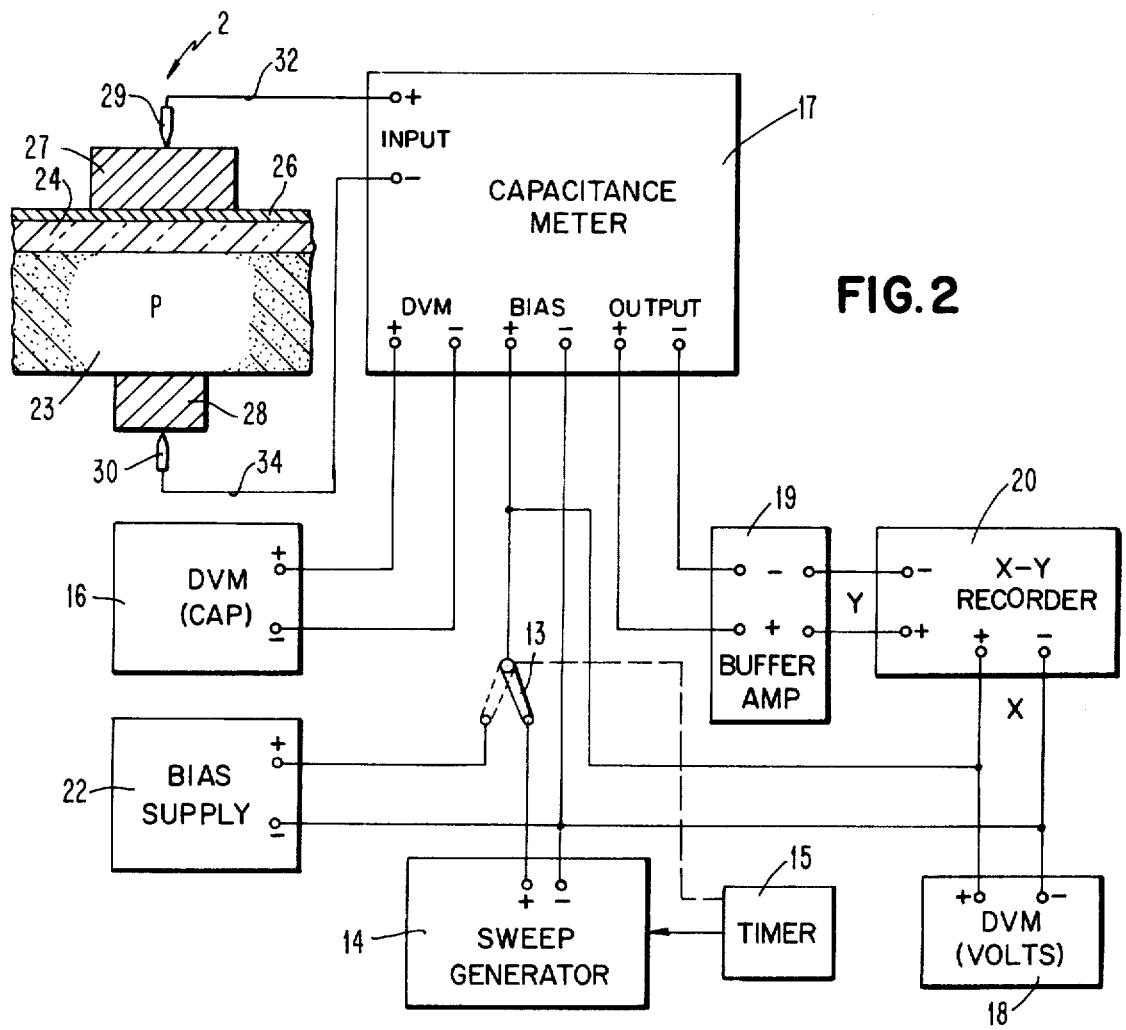
FIG. 2 is a block diagram of the test circuit for measuring the capacitance across a test device over a given potential range.

FIG. 2 illustrates the test equipment which is required for the practice of our invention. The equipment itself is by now quite conventional in the industry and is used in the present invention to make C-V measurements of test device 2 and also to supply the stress bias to the device. The C-V measurements yield the flat band potential, $V_{FB}$, of the capacitor under test. A thorough description of C-V testing is given in the two part publication by Faininger & Heiman entitled: "The C-V Technique as an Analytical Tool" *Solid State Technology*, May & June 1970, pp 49-56 and 46-55, respectively.

Test device 2 is a metal-oxide-silicon capacitor which is fabricated in an area of the wafer which is not used in the operation of the semiconductor devices. It is usually formed in the kerf area of the wafer and may be destroyed when the qualified wafer is diced into semiconductor chips; or, in the case of wafers which are not to be so diced, the kerf area remains but is not utilized as a practical circuit element. Capacitor 2 is, for all practical purposes, a simplified MOS structure which is convenient to fabricate during the fabrication of the transistors and to test as a measure of the important parameters of the transistor structure after the fabrication is completed. The capacitor comprises P-type substrate 23, oxide layer 24, PSG film 26 and a pair of electrodes 27 and 28. The thickness of substrate 23, oxide layer 24 and PSG film 26 is the same as substrate 4, oxide 11 and PSG layer 10, respectively, of the active device illustrated in FIG. 1. Thus, the physical properties of the capacitor insofar as the semiconductor structure and fabrication processes are concerned, is the same as that of the active device illustrated in FIG. 1. The area of the capacitor is typically 100 mil².

It is noted that the concept of using an MOS capacitor as a substitute for an active MOSFET for test purposes has been used in the industry for a number of years and forms no part of our invention.

The test equipment in FIG. 2 comprises a capacitance meter 17 having leads 32 and 34 connected to probes 29 and 30 which form ohmic contact with conductors 27 and 28 of capacitor 2. Bias supply 22 and sweep generator 14 are alternately connectable to the BIAS inputs of meter 17 by means of SPDT switch 13. In the standard C-V test, meter 17 generates a one MHz AC signal. This small signal A.C. voltage is applied with DC bias from sweep generator 14 to the electrodes of device 2. After the C-V test is completed, switch 13 contacts the positive terminal of bias supply 22 which then supplies a potential which acts as the stress field across device 2. Digital voltmeters 16 and 18 and XY recorder 20 serve to monitor and record the results of the C-V measurements. Timer 15 assures that the second C-V test, which is performed after the 2 min. stress interval, is done immediately thereafter, as it has been found that this is most important to the accuracy and reliability of the inventive test technique.

Figure 3:
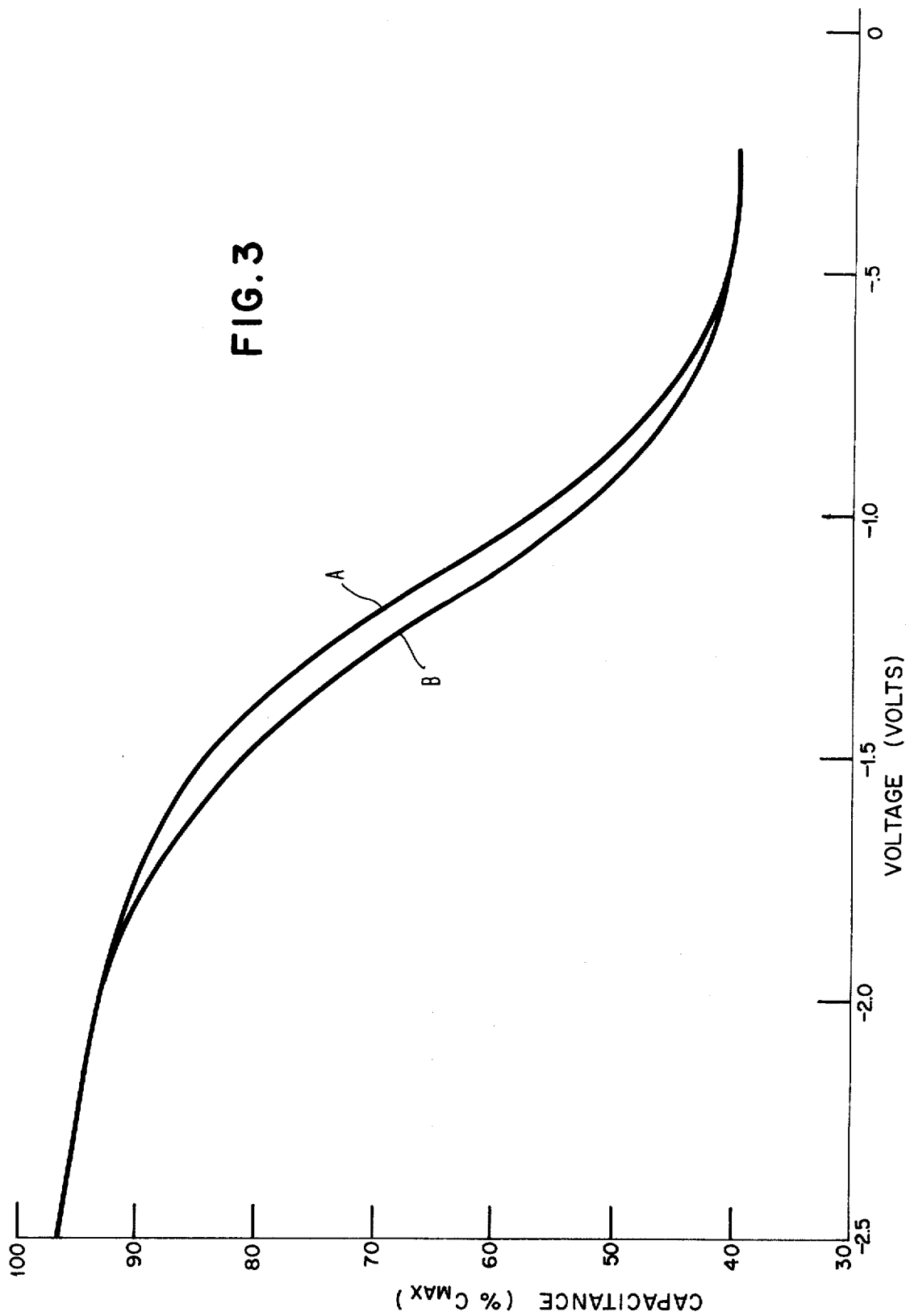
FIG. 3 is a graph of capacitance versus voltage (C-V) curves obtained from the test circuit of FIG. 2 before and after the stress.

FIG. 3 is a capacitance-voltage (C-V) graph showing the results of measurements taken before and after the stress field has been applied to test device which is a capacitor over a p-type substrate. Curve A represents the initial measurement and curve B the measurement after the stress field has been applied. As will be discussed in exhaustive detail in a later portion of this specification, the difference in magnitude of the curves is a critical factor to our tests. C-V testing per se is quite standard in the industry and is used to determine the flat band voltage, $V_{FB}$, of test device 2. $V_{FB}$, in turn, is a measure of the threshold voltage, $V_t$, of the active device illustrated in FIG. 1. It is the shift in $V_{FB}$, after stressing, which has been used to monitor the contamination of gate insulators. In C-V testing, $V_{FB}$ is arbitrarily calculated as a function of oxide thickness and substrate doping level. Thus, in the device represented by the graphs in FIG. 3, $V_{FB}$ is approximately equal to $-1.35$ volts prior to the stress period. The poststress $V_{FB}$ is equal to $-1.45$ volts, for a difference of $-100$ mv.

Figure 4:
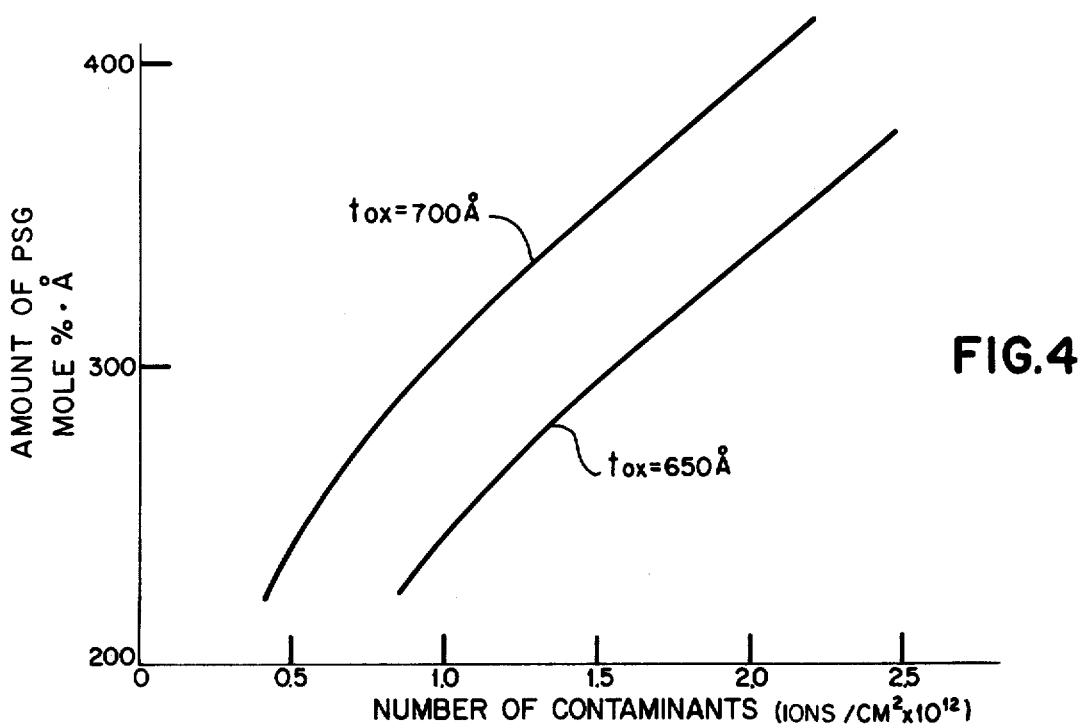
FIG. 4 is a graph illustrating the amount of PSG necessary to trap a given amount of contaminants to guarantee long term device stability.

FIG. 4 is a graph which illustrates that the amount of PSG determines the number of contaminants present in the thin oxide region of the device without deleteriously affecting the stability of the field effect transistor. This relationship guarantees an end-of-life stability condition for a field of $1.43 \times 10^6$ V/cm over $10^5$ hours at 85°C. The curves on the graph are shown for two thicknesses, $t_{ox}$, of the composite oxide layer 10/11 of FIG. 1. In practice, as previously mentioned, the measurements are made across test device 2, so that $t_{ox}$ is the measured thickness of composite layers 24/26.

The relationships in FIG. 4 show that the amount of contaminants which can be trapped by a PSG film is proportional to the thickness·mole percent product ($t_{PSG}$·mole percent) of the PSG and proportional to the overall thickness, $t_{ox}$.

The thickness · mole% product of this layer can be determined from individual wafer monitors using techniques other than the one of the present invention. However, the wafer monitors do not indicate the total PSG variability within a given batch of wafers or even across a given wafer within the lot. In addition, a small amount of the PSG layer is removed by etching after it is deposited and before metallization 12 is applied. This etching step, termed backdoor etching, assures removal of contaminants which might be deposited on the PSG before metallization 12 is applied, thereby depleting the PSG available. The existence of these two factors means that the amount of PSG remaining on the final product cannot be accurately predicted from the various in-line monitors. Moreover, the art had not been able to determine the amount of contaminants present without the higher temperature test already alluded to.

The present invention is directed toward solving this problem.

The etching of the PSG has no significant effect on the values of the curve of FIG. 4. Thus, by knowing the amount of PSG available for a given oxide thickness, the number of contaminants in the device which can be tolerated can be determined from FIG. 4. For example, for a wafer having a composite layer 10/11 which is 700A thick, the amount of PSG expressed in terms of the mole% . thickness product which must be present to protect against $10^{12}$ ions/cm² is 300 mole percent · A. Then, by determining the number of contaminants present, it can be ascertained whether the particular wafer should pass from the production line or be discarded.

Figure 5:
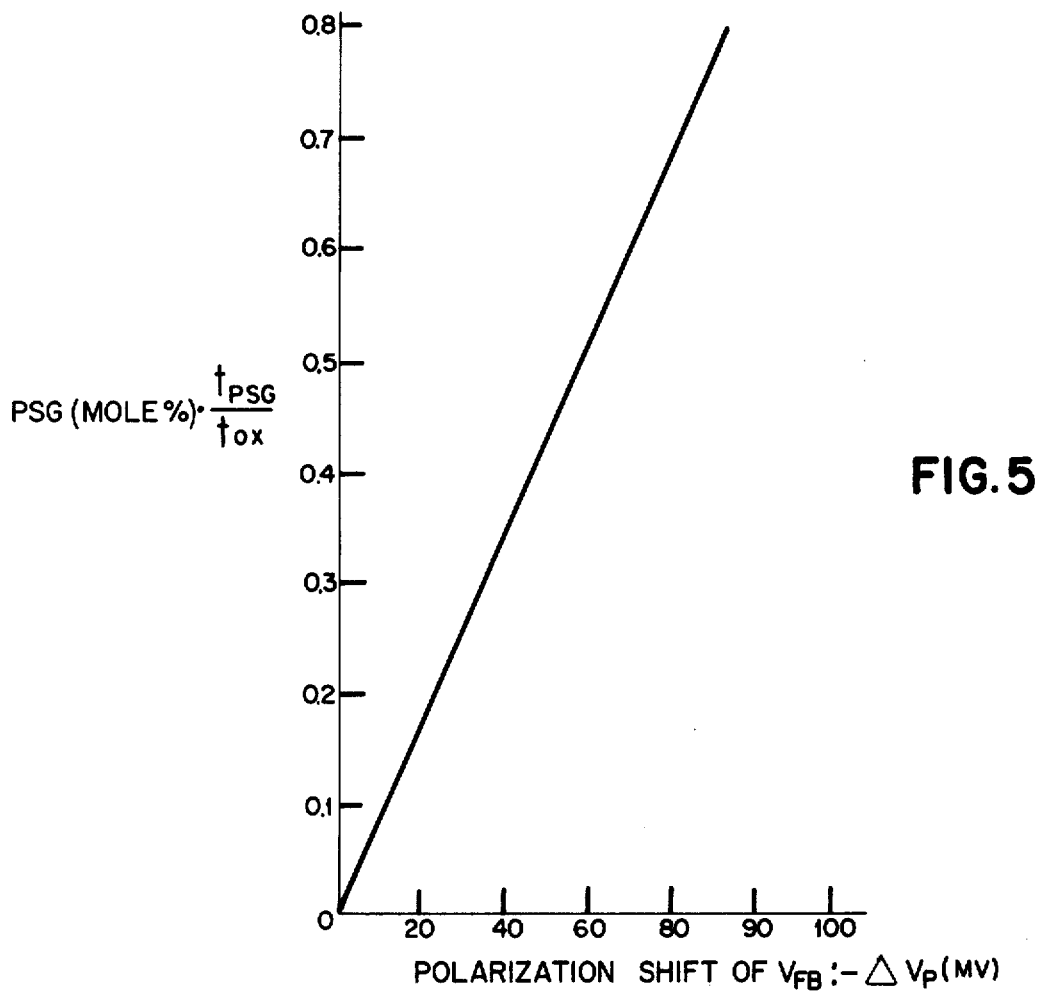
FIG. 5 is a graph illustrating the polarization shift, $\Delta V_p$, of a device as a function of the amount of PSG available.

FIG. 5 illustrates a significant discovery which we have made with respect to testing field effect transistors having contaminant-trapping films. We have found that the room temperature polarization shift of the PSG film is directly proportional to the amount of PSG in the film. FIG. 5 shows this proportionality in terms of PSG mole percent . $t_{PSG}/ox$ vs. the polarization shift of $V_{FB}$, $\Delta V_p$, where $t_{PSG}$ is the thickness of PSG layer 10 in FIG. 1 (layer 26 in FIG. 2). This linear proportionality holds for the range of 1.25 to 5.6 PSG·mole percent, which is the range found to be useful for production line devices. It is this proportionality which allows the determination of the amount of PSG available on the final product without the inherent assumptions needed in attempting to correlate the PSG present on a monitor wafer with the actual value of PSG present on the final product.

The graph in FIG. 5 shows the polarization shift, $\Delta V_p$, with an electric field of $4.3 \times 10^6$ V/cm. at room temperature of 25° C. for a 2 minute stress period. A field of $4.3 \times 10^6$ V/cm corresponds to a potential of around 30 volts across 700 A composite layer.

The technique of determining the polarization shift, $\Delta V_p$, has already been described with respect to FIGS. 2 and 3. The flat-band voltage, $V_{FB}$ is first measured by the standard C-V test using the equipment illustrated in FIG. 2. A potential of 30 volts is then applied through the capacitance meter to probes 29 and 30 across test device 2 for a period of 2 minutes. Immediately thereafter, the post-stress flat band voltage is remeasured and the difference between the initial flatband voltage and the remeasured flatband voltage is $\Delta V_p$. It is important that the room temperature of $V_{FB}$ be taken immediately after the 2 minute stress because the device tends to recover rather quickly and the polarization is reduced accordingly.

The actual values of the stress duration and the electric field are arbitrary; other time periods or electric fields could be utilized satisfactorily. The electric field must be sufficient to cause detectable polarization within the PSG layer; and the stress duration must be sufficient to insure that polarization has occurred but insufficient to cause saturation. Temperatures other than room ambient could also be used, although obviously this is less desirable. The temperature must not be so high as to cause contaminant ion drift. Temperatures as high as 150°C can be utilized.

Returning now to FIG. 5 it can be seen that the measured polarization shift, $\Delta V_p$, can be then used to directly determine total phosphorous content in the PSG in terms of mole percent · $t_{PSG}$. The value of the composite layer thickness, $t_{ox}$, can be calculated in a known manner from the relationship:

$$t_{ox} = \frac{\epsilon_o \cdot k_{ox} \cdot A}{C_{max}} \quad (2)$$

where:
$\epsilon_o$ is the dielectric constant of vacuum;
$k_{ox}$ is the dielectric constant of SiO2;

A is the area of the capacitor in FIG. 2; and $C_{max}$ is the measured maximum capacitance of the device. Alternatively, $t_{ox}$ can be determined from ellipsometric or electron microprobe techniques.

Figure 6:
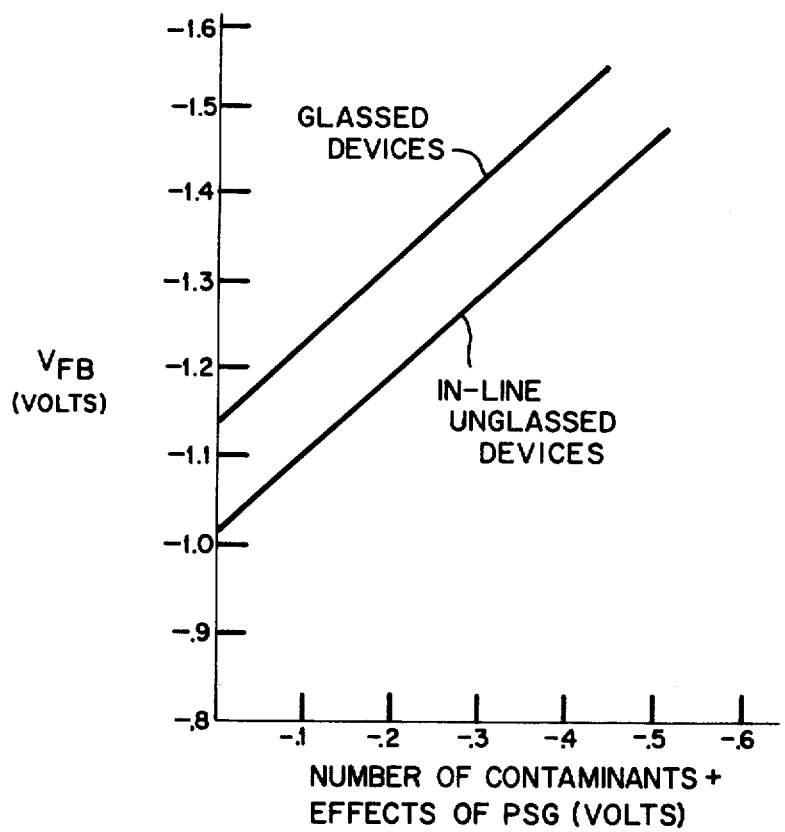
FIG. 6 is a graph of the prestress flatband voltage measured by the circuit of FIG. 2 as a function of the amount of contaminants present and PSG available in the device before and after depositing a protective glass layer thereover.

Having determined the phosphorous content present, the amount of ionic contaminants present on the surface can be determined quite simply by use of a determined relationship between the initial flatband voltage and the work function, the effective charge due to distributed charge in the oxide, the number of phosphorous trapping sites (in terms of the mole percent · thickness product) and the number of ionic contaminants (Na+) present. The relationship is as follows:

$$-V_{FB} = \Delta W_F + \frac{Q_{ox}}{C_o} + f(N_a+) + f(PSG) \quad (3)$$

where:

$\Delta W_F$ is the difference in work function of silicon and aluminum;

$Q_{ox}/C_o$ is the shift due to the total oxide and surface state charge; and $f(N_a+)$ and f(PSG) is the effect of the distribution within the gate oxide of contamination and PSG. In equation (3) $\Delta W_F$, $Q_{ox}/Co$ are known constants for a given MOS capacitor and $V_{FB}$ is the prestress flatband voltage which can be determined from the standard C-V test. The components of $V_{FB}$ due to mobile contamination and the PSG layer are shown in FIG. 6. In addition, as already discussed, the total amount of PSG has been determined, thereby leaving the amount of Na+ as the only unknown in equation (3).

Therefore, the amount of contaminants present can be calculated; and a comparison between the amount of PSG present and the amount of contaminants present on the surface can be made to determine whether there is sufficient PSG to trap the contaminants.

For a device having an oxide thickness, $t_{ox}$, of 700A, an empirical equation derived from equation (3), substituting appropriate numerical values, is:

$$-V_{FB} = .99 + 2.4 \times 10^{-13} \text{ Na}^+/\text{cm}^2 \cdot \frac{\text{volts cm}^2}{\text{Na}^+} + 3.4 \Delta V_p \quad (4)$$

where

.99 represents $\Delta W_F + \frac{Q_{ox}}{C_{ox}}$ for the device of

FIG. 2 which is an "in-line" device not completely fabricated;

the total amount of contamination is given in terms of Na+ per $cm^2$; and $\Delta V_p$ is the PSG room temperature polarization shift.

For devices which have been fully fabricated, a quartz protective layer is commonly applied over the entire device. This changes the value of $C_o$ in equation (3) and the flatband voltage of a glassed product is given by equation 5:

$$-V_{Fb} = 1.16 + 2.4 \times 10^{-13} \text{ Na}^+/\text{cm}^2 + 3.4 \Delta V_p \text{ TM}(5)$$

FIG. 6 is a graph of equations (4) and (5), plotting flatband voltage as a function of combined PSG and contamination levels. As already noted, the graphs were empirically determined for 100 mil² MOS test capacitors having oxide thickness, $t_{ox}$, of 700A. $t_{ox}$ is calculated from $C_{max}$; $V_{FB}$ is determined from the initial C-V trace; $\Delta V_p$ is measured after a 2 minute, 25°C stress at a field of $4.3 \times 10^6$ volts/cm; and the actual contamination level is calculated from high temperature stressing.

Figure 7:
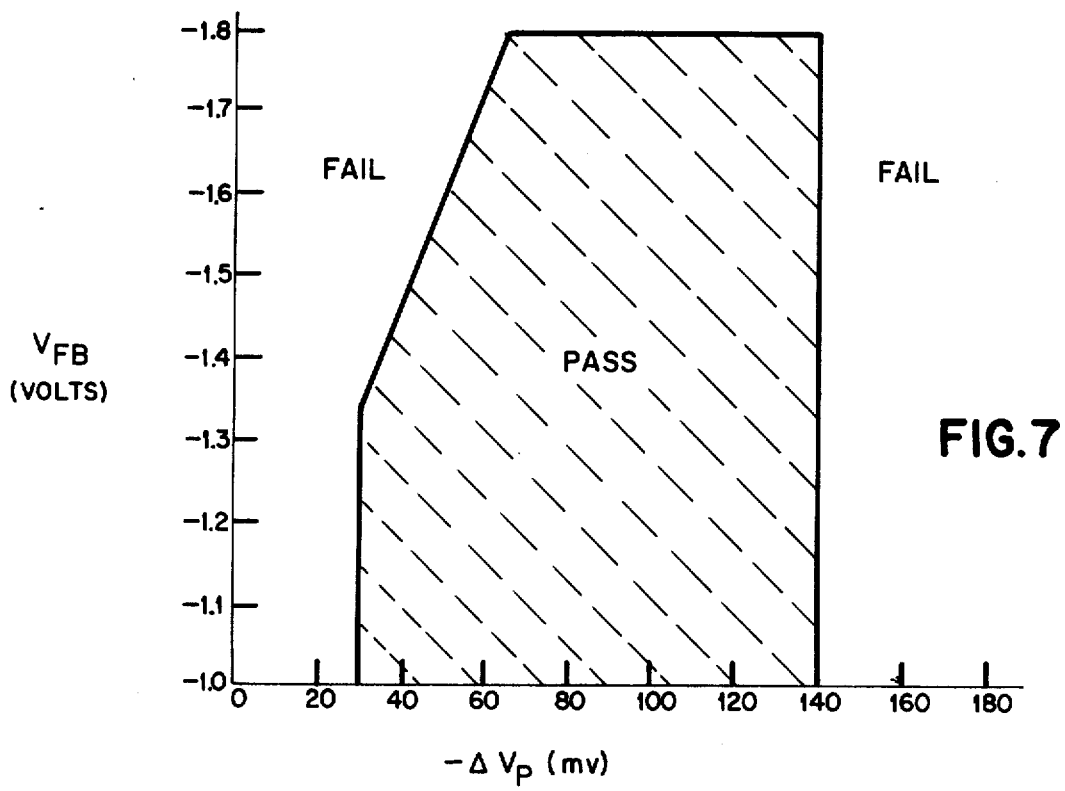
FIG. 7 is a graph of the prestress flatband voltage versus polarization shift to illustrate the pass-fail criteria applied to production-line devices.

FIG. 7 is a chart which is suitable for use by a production line technician for determining whether a test device passes or fails the reliability test. It will be noted by those of skill in this art that this graph would be satisfactory for use only with a specifically defined product which is capable of manufacture to close tolerances. It is presented in this specification only as an example and to show a specific preferred embodiment of the invention which has been more broadly described in previous sections of this specification.

FIG. 7 shows that it is enough to know the initial flatband voltage, $V_{FB}$ and the room temperature polarization shift $\Delta V_p$, to determine whether a device passes or fails. FIG. 7 is derived in the following manner: The minimum amount of phosphorous, expressed in terms of mole percent · thickness product on completely fabricated wafers should be 180A percent. This protects against a mobile contamination level of $3 \times 10^{11}/cm^2$; which is a typical value of contamination found in the production line. This amount of PSG causes a room temperature polarization shift, $\Delta V_p$, of 30 millivolts; thus the minimum $\Delta V_p$ as shown on the graph is 30 millivolts. Nominal product is centered at 70 mv, which is a PSG mole percent · thickness product of 420A percent.

The sloped portion of the curve is derived from values previously obtained with respect to FIG. 6. For example, at $\Delta V_p = 30$ mv, the effects of PSG on $V_{FB}$ is $3.4 \times 30 = 102$ mv. The effect of a contamination level of $3 \times 10^{11}/cm^2$ is $2.4 \times 10^{-13} \times 3 \times 10^{11} = 72$ mv. The intercept in FIG. 6 is 1.16 volts. The total of these three values is $V_{FB} = 1.34$ volts as shown in FIG. 7.

For a greater value of $\Delta V_p$, the contamination level can be greater and the value of $V_{FB}$ in FIG. 7 increases according to the sloped portion of the graph.

The upper limit of $\Delta V_p$ is set at 140 millivolts to insure that the use condition polarization shift does not exceed 0.2V. An additional constraint on the most negative value of $V_{FB}$ is set at −1.8 volts to establish a minimum threshold voltage $V_T$ of + 0.5 volts on the active devices in the array.

Although the invention has been particularly shown and described with reference to the preferred embodiments thereof, it will be understood by those skilled in the art that the foregoing and other changes in form and details may be made therein without departing from the spirit and scope of the invention.

What is claimed is:

1. A method for determining the stability of semiconductor devices which include a phosphosilicate glass film on the surface thereof to trap contaminants comprising the steps of:

measuring the initial flatband potential across said film;

applying a fixed potential across said film for a duration sufficient to polarize said film and at a temperature insufficient to cause said contaminants to drift;

remeasuring the flatband voltage to determine the polarization of said film;

determining the amount of phosphosilicate glass in said film using the value of polarization;

determining the amount of contaminants present using the value of said initial flatband potential and the value of said polarization; and comparing said determined amounts to insure that the amount of phosphosilicate glass is sufficient to trap the contaminants present.

2. A method as in claim 1 wherein said phosphosilicate glass film is disposed on a silicon dioxide insulator.

3. A method as in claim 1 wherein:
said fixed potential is around $4.3 \times 10^6$ volts per centimeter;
said temperature is at room ambient; and
said duration is around two minutes.

4. A method as in claim 3 wherein the combined thickness of said phosphosilicate glass film and said silicon dioxide insulator is 700A and said fixed potential is 30 volts.

5. A method as in claim 2 wherein said phosphosilicate glass film and said silicon dioxide insulator are fabricated in the kerf area of a semiconductor wafer containing integrated circuit arrays of MOSFET devices and said method is an indicator for the reliability of said MOSFET devices.

6. A method for testing the stability of the threshold voltage of field effect transistors which include a phosphosilicate glass film as a gate insulator comprising the steps of:

measuring the initial flatband potential across said film;

applying a fixed potential across said film at ambient temperatures for a duration sufficient to polarize said film;

remeasuring the flatband voltage after said potential application to determine the polarization of said film; and determining from the measured values of said initial flatband potential and said polarization whether there is sufficient phosphosilicate glass available to trap contaminants present on the surface of said field effect transistors.

* * * * *